Patented Dec. 5, 1922.

1,438,019

UNITED STATES PATENT OFFICE.

LUDWIG W. BUCKLEY, OF WEST SOMERVILLE, MASSACHUSETTS, ASSIGNOR TO THE GOUDEY GUM CO., OF BOSTON, MASSACHUSETTS, A CORPORATION OF MASSACHUSETTS.

SYNTHETIC CHICLE COMPOUND AND METHOD OF MAKING SAME.

No Drawing. Substitute for application Serial No. 277,220, filed February 15, 1919. This application filed August 11, 1919. Serial No. 316,598.

*To all whom it may concern:*

Be it known that I, LUDWIG W. BUCKLEY, a citizen of the United States, and resident of West Somerville, county of Middlesex, Commonwealth of Massachusetts, have invented an Improvement in Synthetic Chicle Compounds and Methods of Making Same, of which the following description is a specification.

This invention relates to the manufacture of synthetic compounds adapted for use as a base of chewing gum and particularly to the production of such a compound exhibiting masticatory qualities such as is possessed by natural chicle gum that has heretofore been largely used for the manufacture of gum. Owing to the difficulty of obtaining satisfactory native chicle in required quantities, various substitutes in whole or in part for the chicle gum have been proposed these usually including a substantial proportion of pontianac gum and also of gutta-percha. Of these substitute materials pontianac gum alone possesses in its natural state the live quality and resiliency that is necessary for satisfactory gum material. Pontianac gum however as commercially available has mixed therewith certain oils and acids which would give an objectionable taste to the gum and hence it has been necessary to treat the pontianac with chemicals adapted to remove these acids and oils. This has heretofore been accomplished by the use of caustic soda and like chemicals which while removing the oils has also destroyed the fibre of the pontianac gum so that it loses its resiliency and live quality. It has hence been heretofore necessary to add a substantial proportion of native chicle gum to the compound to impart the necessary live resilient quality. I have discovered that by suitable treatment with certain salt solutions of a mildly alkaline nature, pontianac gum may be cleansed and purified of the oils and acids which give it the described objectionable taste so that it is available to impart the requisite live quality to the gum and it may hence be used in a suitable mixture with other filling substance such as gutta-percha to make a complete gum base without requiring any natural chicle gum at all. In accordance with my invention I make up a gum compound consisting preferably of about forty per cent of live pontianac gum purified as hereinafter described, with about fifty-five per cent of what is known in the trade as "gutta-percha K," i. e., soft, white gutta-percha, and about five per cent of ordinary gutta-percha. In carrying out my invention the pontianac gum is placed in a suitable agitator such as an ordinary rubber washing machine and hot water is applied thereto approximately twenty minutes. Then the supply of hot water is shut off and a suitable special preparation of salt product is applied to the gum, the same being mixed with the water residuum in the washing machine. For this purpose I preferably employ the composite salt product known commercially as "oakite" using the same in the proportion of one pound of oakite to one hundred twenty-five pounds of pontianac. This mass is allowed to mix for about fifteen minutes during which the oakite emulsifies the oils and neutralizes the acids in the gum and thus makes it possible to flood the oils and other impurities out of the pontianac. Then boiling hot water is made to stream through the mass for a considerable period, in practice from one-half hour to two hours. Then the pontianac is removed from the washer and is ready for mixing. The salt product "oakite" is composed of sodium triphosphate about ninety-five per cent and sodium diborate or borax about four per cent with traces of certain other salts but the sodium triphosphate with the sodium diborate in approximately the proportions stated are the essential active ingredients of the preparation and I have found that best results are obtained from these ingredients in substantially or approximately this proportion. The soft, white gutta-percha ingredient, "gutta-percha K" is also placed in the rubber washer and lukewarm water is applied to soften the same and make it stick to the rolls. After being thoroughly softened the mass is flooded with cold water, this process removing the bark and other impurities such as sand from the material. The plain gutta-percha ingredient is chopped up with a hatchet to remove as much as possible of the bark and is then placed in the washing machine and flooded with warm water to remove the remaining bark and other impurities. The ingredients named prepared as described are then placed according to the percentages named in a steam-jacketed mixer, and thoroughly mixed and ground up together with the application of heat. The mass is then placed in a suitable press, forced through a sieve mesh, rolled out into slabs and placed on tables to dry and harden. In this described compound the pontianac gum retains its native live quality which it imparts to the entire mass, while the use of the gutta-percha K makes the gum lighter in color, so that it closely approximates a natural chicle color. The described treatment of the pontianac gum with the sodium triphosphate and borax preparation or with the composite soft compound "oakite" is the preferred method and one which I have found to attain the most satisfactory results when employed approximately in the proportions stated. Unless this salt preparation or equivalent one is employed up to approximately this strength it is not wholly efficacious for thoroughly cleansing the pontianac. The use of this relatively mild alkaline salt does not destroy or seriously impair the fiber texture of the pontianac gum and the gum thus retains its live quality or property adapting it for use as a chewing gum base without the addition of the relatively scarce and high priced native chicle.

Having described my invention, what I claim as new and desire to secure by Letters Patent is:

1. The herein described method which consists in treating pontianac gum with a mildly alkaline salt solution consisting of a major proportion of sodium triphosphate and a minor proportion of sodium diborate to emulsify oily matter and neutralize acids, and in flushing out the gum mass thus treated with hot water to render the pontianac suitable for a chewing gum base.

2. The herein described method which consists in treating pontianac gum with a mildly alkaline salt solution comprising sodium triphosphate about ninety-five per cent and sodium diborate about four per cent to emulsify oily matter and neutralize acids, and in flushing the gum mass with hot water.

3. The herein described method which consists in treating pontianac gum with a mildly alkaline salt solution in the proportion of about one pound of salt product to one hundred twenty-five pounds of gum, and in flushing the mass so treated with hot water.

4. The herein described method which consists in treating pontianac gum with a saline solution of a relatively mild alkaline nature of sufficient strength to emulsify oily matter and neutralize acids in the gum, and in flushing the gum mass thus treated with water.

5. The herein described method which consists in agitating pontianac gum in the presence of hot water for a substantial interval, then agitating the mass in the presence of a saline solution of a relatively mild alkaline nature, then flooding the mass with hot water to remove emulsified oily matter and neutralized acids.

6. The herein described method which consists in purifying pontianac gum by subjecting the same to the action of a saline solution.

7. The herein described method which consists in treating pontianac gum with hot water for a substantial interval, then treating the mass with a mildly saline solution, then again flooding the mass with hot water to remove oily matter, and then mixing the purified mass with a substantial proportion of gutta percha to make a chewing gum base.

In testimony whereof, I have signed my name to this specification.

LUDWIG W. BUCKLEY.